United States Patent
Amerga et al.

(10) Patent No.: US 7,133,702 B2
(45) Date of Patent: Nov. 7, 2006

(54) IDLE MODE CELL REACQUISITION AND RESELECTION

(75) Inventors: Messay Amerga, San Diego, CA (US); Sudhir Halbhavi, San Diego, CA (US)

(73) Assignee: Qualcomm Incorporated, San Diego, CA (US)

(*) Notice: Subject to any disclaimer, the term of this patent is extended or adjusted under 35 U.S.C. 154(b) by 613 days.

(21) Appl. No.: 10/318,695

(22) Filed: Dec. 12, 2002

(65) Prior Publication Data

US 2004/0043798 A1    Mar. 4, 2004

Related U.S. Application Data

(60) Provisional application No. 60/406,455, filed on Aug. 27, 2002.

(51) Int. Cl.
*H04Q 7/22* (2006.01)
*H04B 1/40* (2006.01)

(52) U.S. Cl. .................... 455/574; 455/343.4

(58) Field of Classification Search ............ 455/343.1, 455/343.2, 343.3, 343.4, 343.5, 343.6, 574
See application file for complete search history.

(56) References Cited

U.S. PATENT DOCUMENTS 5,790,589 A    8/1998   Hutchison, IV et al.
6,073,035 A *  6/2000   Witter ................... 455/574
6,535,752 B1 * 3/2003   Dent .................... 455/574
6,606,490 B1 * 8/2003   Rainish et al. .......... 455/574 X
6,799,030 B1 * 9/2004   Barber et al. ............ 455/343.1
2002/0025811 A1 * 2/2002 Willey ..................... 455/434

FOREIGN PATENT DOCUMENTS

WO    0120942    3/2001
WO    0207459    1/2002

* cited by examiner

*Primary Examiner*—Matthew D. Anderson
*Assistant Examiner*—Philip J. Sobutka
(74) *Attorney, Agent, or Firm*—Philip R. Wadsworth; Charles D. Brown; George C. Pappas

(57) ABSTRACT

Techniques for cell reacquisition and reselection that increases time spent in low-power mode while effectively monitoring neighbor cells are disclosed. In one aspect, one or more windows around the expected location of the serving cell are searched in the period of time prior to the page indicator. In another aspect, intra-frequency neighbor cells are searched first to determine reselection candidates. Various other aspects are also presented. These aspects have the benefit of increasing time spent in low-power mode, thereby reducing power consumption and increasing standby time.

27 Claims, 10 Drawing Sheets

IDLE MODE CELL REACQUISITION AND RESELECTION

RELATED APPLICATIONS

This application claims benefit of U.S. Provisional Patent Application No. 60/406,455, filed Aug. 27, 2002 and entitled "WCDMA PHYSICAL LAYER REQUIREMENTS FOR CELL SELECTION AND RESELECTION."

FIELD

The present invention relates generally to communications, and more specifically to a novel and improved method and apparatus for idle mode cell reacquisition and reselection.

BACKGROUND

Wireless communication systems are widely deployed to provide various types of communication such as voice and data. These systems may be based on code division multiple access (CDMA), time division multiple access (TDMA), or some other modulation techniques. A CDMA system provides certain advantages over other types of systems, including increased system capacity.

A CDMA system may be designed to support one or more CDMA standards such as (1) the "TIA/EIA-95-B Mobile Station-Base Station Compatibility Standard for Dual-Mode Wideband Spread Spectrum Cellular System" (the IS-95 standard), (2) the standard offered by a consortium named "3rd Generation Partnership Project" (3GPP) and embodied in a set of documents including Document Nos. 3G TS 25.211, 3G TS 25.212, 3G TS 25.213, and 3G TS 25.214 (the W-CDMA standard), (3) the standard offered by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," and the "C.S0024 cdma2000 High Rate Packet Data Air Interface Specification" (the cdma2000 standard), and (4) some other standards. Non-CDMA systems include the AMPS and GSM systems.

When a mobile station first acquires a system, one or more available base stations or cells are identified by the mobile station. Typically a single cell is selected as the serving cell. When the mobile station is not actively communicating for a voice call or data session, it is said to be in idle mode. The mobile station the serving cell to determine if an event, such as an incoming call, would require the mobile station to leave idle mode. As the communication channel between the serving cell and the mobile station changes, the mobile station must periodically test the channel to determine if that cell is still suitable. For example, the communication channel will change as the mobile station moves between cells within a system or between one or more neighboring systems. Occasionally a new serving cell will be selected, a process known as cell reselection, or idle mode handoff.

During idle mode, a mobile station may go into a low-power, or "sleep" state, to reduce power consumption. A mobile station may discontinue reception during sleep state to allow receive circuitry to be disabled. Periodically, the mobile station must come out of sleep state, or "wake up", reacquire the serving cell, and monitor signals therefrom to determine if an incoming call is being directed to the mobile station. For example, a page indicator may be directed to a mobile station, to indicate whether the mobile station should enter active communications, or whether the low-power state can be reentered. During this time, a cell reselection process may be performed to determine if cell reselection is necessary. It is desirable for the mobile station to go back to the sleep state as soon as possible if it is to remain in idle mode, in order to conserve power. If a cell reselection is necessary, the mobile station may remain awake longer, in order to process the reselection.

It is desirable for a mobile station to wake up no sooner than necessary to receive the page indicator. However, the time required to reacquire the serving cell, or identify a reselection candidate if the serving cell has become unavailable, will vary according to changes in the communication channel conditions. Power conservation, and the associated benefits of reduced battery requirements and increased standby times, can be increased by minimizing the portion of a sleep cycle spent in reacquisition and reselection procedures. Concurrently, however, other system considerations may require adequate assessments of channel conditions associated with various neighbor cells, as well as timely and accurate response to page indicators. There is therefore a need in the art for cell reacquisition and reselection that increases time spent in low-power mode while effectively monitoring neighbor cells.

SUMMARY

Embodiments disclosed herein address the need for cell reacquisition and reselection that increases time spent in low-power mode while effectively monitoring neighbor cells. In one aspect, one or more windows around the expected location of the serving cell are searched in the period of time prior to the page indicator. In another aspect, intra-frequency neighbor cells are searched first to determine reselection candidates. Various other aspects are also presented. These aspects have the benefit of increasing time spent in low-power mode, thereby reducing power consumption and increasing standby time.

The invention provides methods and system elements that implement various aspects, embodiments, and features of the invention, as described in further detail below.

BRIEF DESCRIPTION OF THE DRAWINGS

The features, nature, and advantages of the present invention will become more apparent from the detailed description set forth below when taken in conjunction with the drawings in which like reference characters identify correspondingly throughout and wherein.

DETAILED DESCRIPTION

Figure 1:
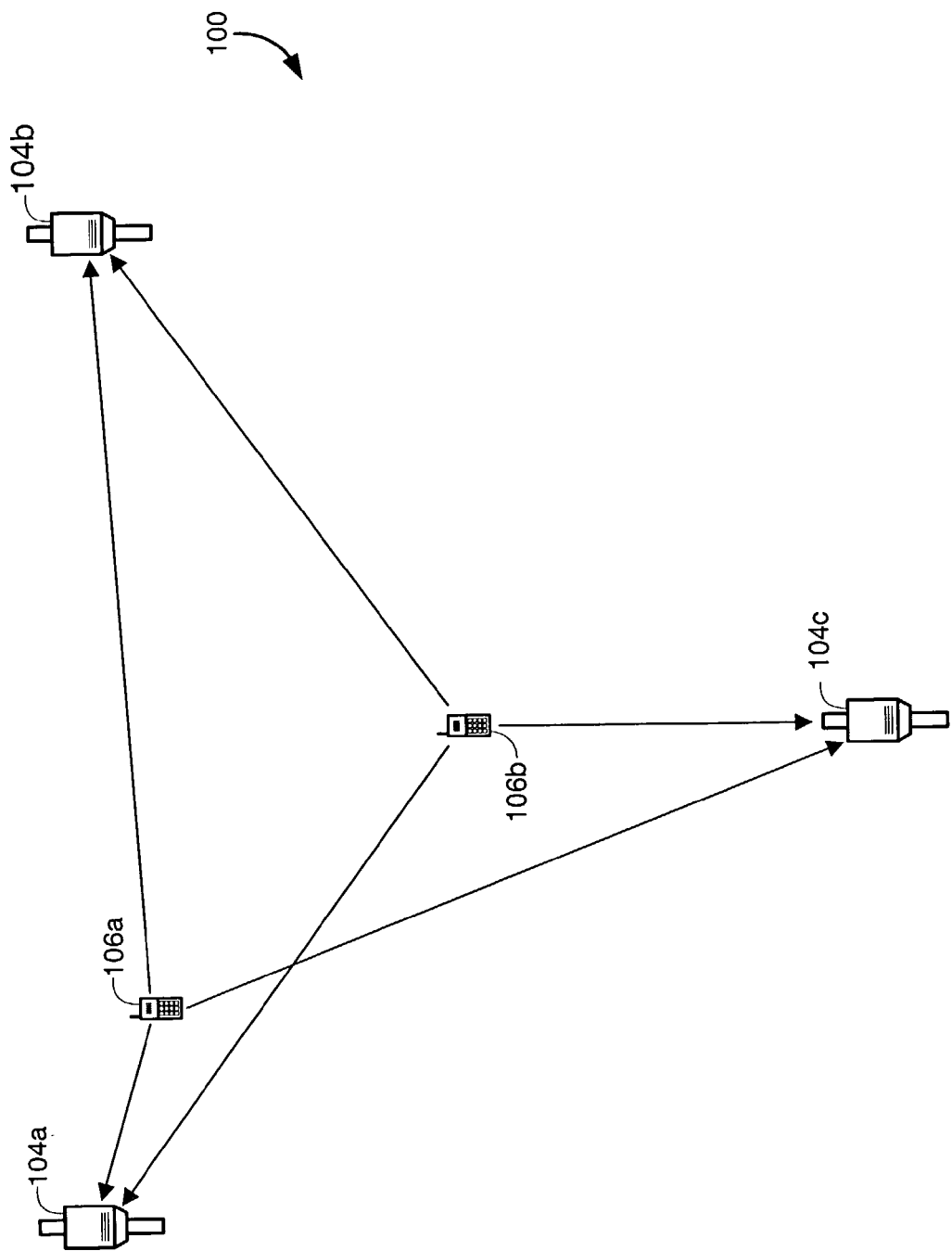
FIG. 1 is a general block diagram of a wireless communication system capable of supporting a number of users.

FIG. 1 is a diagram of a wireless communication system 100 that may be designed to support one or more CDMA standards and/or designs (e.g., the W-CDMA standard, the IS-95 standard, the cdma2000 standard, the HDR specification). System 100 may also deploy any wireless standard or design other than a CDMA system, such as a GSM system. In an example embodiment, system 100 may contain base stations conforming to the W-CDMA standard as well as the GSM standard.

For simplicity, system 100 is shown to include three base stations 104 in communication with two mobile stations 106. The base station and its coverage area are often collectively referred to as a "cell". In IS-95 systems, a cell may include one or more sectors. In the W-CDMA specification, each sector of a base station and the sector's coverage area is referred to as a cell. As used herein, the term base station can be used interchangeably with the terms access point or NodeB. The term mobile station can be used interchangeably with the terms user equipment (UE), subscriber unit, subscriber station, access terminal, remote terminal, or other corresponding terms known in the art. The term mobile station encompasses fixed wireless applications.

Depending on the CDMA system being implemented, each mobile station 106 may communicate with one or more base stations 104 on the forward link at any given moment, and may communicate with one or more base stations on the reverse link depending on whether or not the mobile station is in soft handoff. The forward link (i.e., downlink) refers to transmission from the base station to the mobile station, and the reverse link (i.e., uplink) refers to transmission from the mobile station to the base station.

For clarity, the examples used in describing this invention may assume base stations as the originator of signals and mobile stations as receivers and acquirers of those signals, i.e. signals on the forward link. Those skilled in the art will understand that mobile stations as well as base stations can be equipped to transmit data as described herein and the aspects of the present invention apply in those situations as well. The word "exemplary" is used exclusively herein to mean "serving as an example, instance, or illustration." Any embodiment described herein as "exemplary" is not necessarily to be construed as preferred or advantageous over other embodiments.

Cell selection is the process that allows a mobile station to select a suitable cell of a particular system. A mobile station first accesses a system (during power-up, for example), and selects a base station, or serving cell, with which to establish communication, in accordance with certain cell selection conditions. A mobile station may be in idle mode, that is, without an active call or data session in progress. In idle mode, the mobile station can intermittently monitor the serving cell to, among other things, determine if an incoming call is being directed to the mobile station. In a typical wireless communication system, a mobile station will maintain communication with, or "camp" on, a single cell while in idle mode. Periodically, a mobile station may monitor the serving cell to determine if the selection conditions are still being met. During idle mode, the mobile station may progress through any number of sleep cycles. A portion of the sleep cycle is spent asleep, or in low-power mode, during which time signal reception is discontinued and various components of the mobile station are powered off or put in a low-power state. During the sleep cycle, the mobile station wakes up, reacquires the serving cell (if it is available), and performs the required monitoring.

In addition, surrounding base stations can be monitored to determine if the mobile station should attempt to reselect to another cell. Cell reselection is the process that allows the mobile station to detect and camp on a more "suitable" cell than the current serving cell. Cell reselection is a term used in the W-CDMA standard, and the process is similar to idle handover in IS-95 or IS-2000 systems. In each of these three exemplary systems, cell selection and reselection is autonomously completed by the mobile station. Thus, a mobile station can roam in and between various systems, updating the current serving cell as appropriate, with a minimal amount of signaling required between the mobile station and the various cells or base stations within the systems.

A mobile station commonly maintains various lists of base stations or cells in and around its current location. An active set is the set of cells with which the mobile station is communicating. It is common for the active set to contain only a single cell, the serving cell, while the mobile station is in idle mode, although the active set can contain any number of cells within the scope of the present invention. A list of neighboring cells may be kept in a neighbor list. A set of cells that should be periodically monitored, for example, when the serving cell no longer meets the selection conditions, can be kept in a monitored list. Various techniques for determining active sets, neighbor lists, monitored lists, and the like are well known in the art, and any such technique can be deployed within the scope of the present invention.

In FIG. 1, a mobile station 106 may be operable with one or more communication systems 100, conforming to one or more standards, examples of which are given above. A system standard commonly provides requirements for cell selection, reselection and the like. In some cases, procedures are not specified directly, but performance criteria are set forth that must be adhered to by base stations or mobile stations within the system. An exemplary cell selection procedure conforming to the W-CDMA standard, and operable with multiple system formats (including W-CDMA and GSM) is detailed below with respect to FIGS. 8A and 8B. However, the principles of the present invention are not limited to W-CDMA systems, and can be applied to any communication system.

It is typically desirable for a mobile station to minimize power consumption, which yields increased standby or "talk" times for a given battery configuration, or allows a reduced cost and/or smaller battery. For the purpose of discussion, the embodiments herein are described in the context of idle mode operation, a mode in which low power operation is desirable. In the exemplary W-CDMA embodiment, serving cell reacquisition, neighbor cell monitoring, and cell reselection may occur during idle mode. Active mode operation may provide for cell handoff according to a different set of procedures. However, this distinction is for clarity of discussion only. Those of skill in the art will readily adapt the principles disclosed herein to any system or mode in which maximizing the duration of the low-power state is desirable.

In the example W-CDMA embodiment, a mobile station can enter "sleep" mode, which can be interchanged with the term idle mode. In sleep mode, the mobile station sequences through one or more Discontinuous Reception (DRX) cycles until the mobile station receives or initiates an incoming call or data transmission. During each DRX cycle, the mobile station goes to sleep, discontinuing reception, and disabling as much circuitry as possible to achieve a low power state. For example, radio frequency (RF) and baseband processing components may be shut off during this time. During each DRX cycle, the mobile station "wakes up" to reacquire and monitor the current serving cell. The mobile station may need to search for and locate the serving cell if the communication channel has changed or the timing between the base station and mobile station has drifted. Examples of this process are described in further detail below. The serving cell may be measured to determine if the selection conditions are still being met. Periodically, the monitored set may need to be searched to determine if reselection is in order. Once the current serving cell is located, the mobile station can monitor the serving cell (for example, a paging channel), and return to sleep for the next DRX cycle if active communication is not required. If additional neighbor monitoring or cell reselection is required, additional time may be required. Reducing the portion of a DRX cycle during which a mobile station must remain awake allows for a corresponding savings in power. Therefore it is desirable to wake up no sooner than required to reacquire the serving cell and receive the paging channel. Various embodiments are described below in which a subset of possible searching is performed prior to receiving a page indicator. When that search subset results in successful acquisition, the page indicator can be received, and the mobile station can reenter the sleep state soon thereafter, when applicable. When the initial search subset does not result in successful acquisition, or when additional searching is desired (such as neighbor cell monitoring), the mobile station may need to remain awake for additional time. Once these steps are completed, the mobile station can reenter sleep state and await the page indicator of the next sleep cycle. Those of skill in the art will recognize myriad combinations of search procedures allocated to the first subset and remaining subset, in accordance with the teachings herein. Various example embodiments are detailed below.

Figure 2:
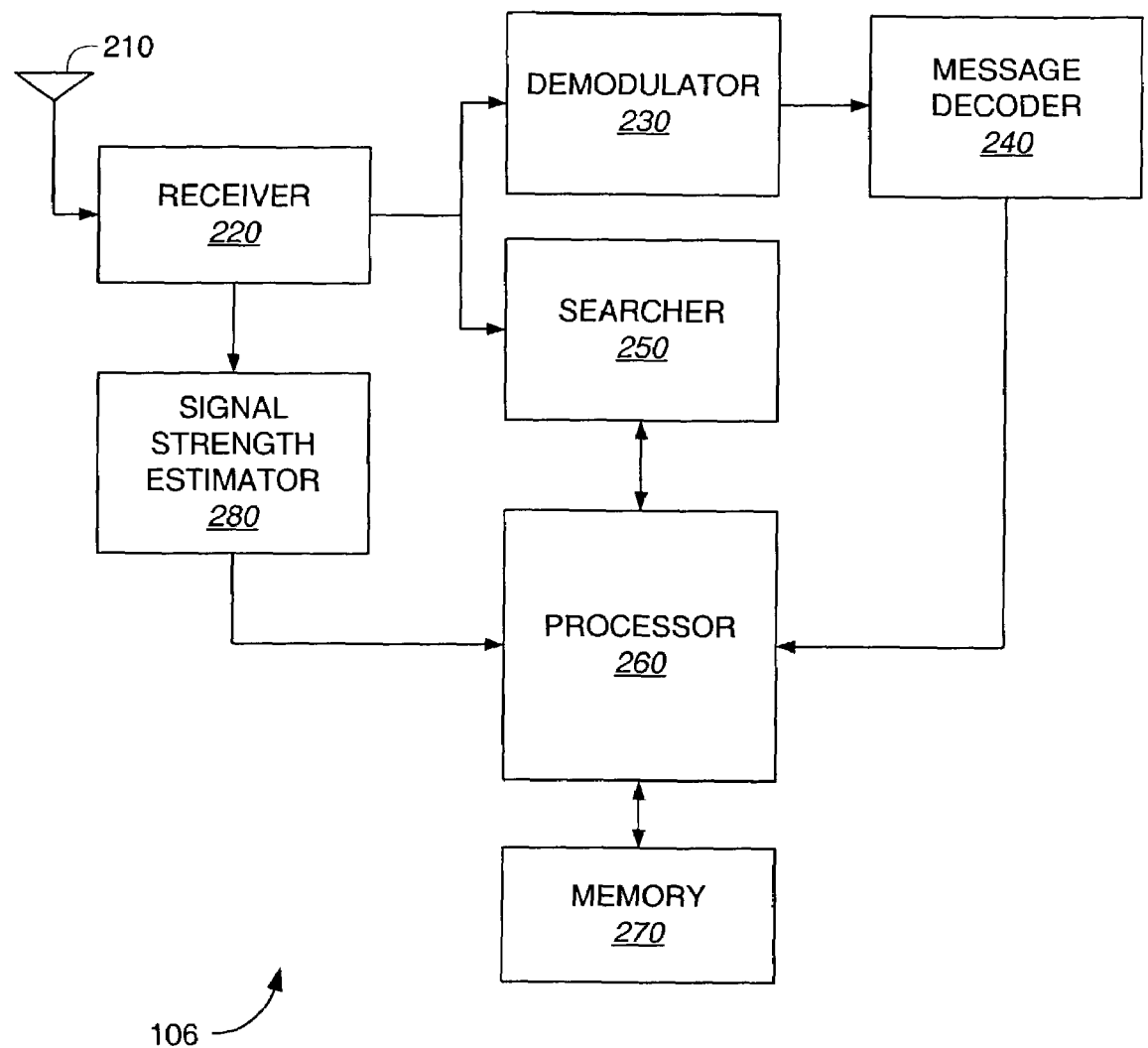
FIG. 2 depicts an exemplary embodiment of a mobile station equipped for cell reacquisition and reselection.

FIG. 2 depicts a portion of an embodiment of a mobile station 106. Signals are received at antenna 210 and delivered to receiver 220. Receiver 220 performs processing according to one or more wireless system standards, such as the cellular standards listed above. Receiver 220 may perform various processing such as Radio Frequency (RF) to baseband conversion, amplification, analog to digital conversion, filtering, and the like. Various techniques for receiving are known in the art. Note that some or all of the components of receiver 220 may be disabled or put in a low-power state to conserve power while sleeping in idle mode.

The mobile station 106 can communicate with a base station 104 by tuning receiver 220 according to the parameters associated with the base station. Receiver 220 may be directed to periodically tune to an alternate frequency to measure the channel quality of a cell on an alternate frequency, including those on alternate systems. Receiver 220 may be used to measure channel quality of the current serving cell, as well neighbor base stations, although a separate signal strength estimator 280 is shown in FIG. 2 for clarity of discussion (detailed below).

Signals from receiver 220 are demodulated in demodulator 230 according to one or more communication standards. In one example embodiment, a demodulator capable of demodulating W-CDMA and GSM signals is deployed. Additional standards, such as IS-95 or cdma2000, may also be supported in an alternate embodiment. Demodulator 230 may perform RAKE receiving, equalization, combining, deinterleaving, decoding, and various other functions in accordance with the format of the received signals. Various demodulation techniques are known in the art.

Message decoder 240 receives demodulated data and extracts signals or messages directed to the mobile station 106 by the system 100 through one or more base stations 104. Message decoder 240 decodes various messages used in setting up, maintaining and tearing down a call (including voice or data sessions) on a system. Messages may include neighbor cell information. Messages may include various parameters for use in cell selection and reselection, detailed further below. Single bit messages may be supported as well. For example, a page indicator bit included in a Page Indicator Channel (PICH) can be decoded in message decoder 240. Various other message types are known in the art and may be specified in the various communication standards being supported. The messages are delivered to processor 260 for use in subsequent processing. Some or all of the functions of message decoder 240 may be carried out in processor 260, although a discrete block is shown for clarity of discussion.

Signals from receiver 220 are also directed to searcher 250. Searcher 250 may be used to locate various cells available to the mobile station, including the serving cell and neighboring cells. Searcher 250 may be directed by processor 260 to search for cells and to indicate channel quality metrics associated with those cells to processor 260. Search results may be used to direct demodulator 230 to demodulate various signals, as well as for use in cell selection or reselection. Searcher 250 may be deployed to support searching cells of any type of system supported by mobile station 106. As described in further detail below, searcher 250 may, upon waking up during a sleep cycle, be directed to search for the previous serving cell, within a certain search window. If the initial search does not successfully locate the serving cell, the search window may be increased, and the search repeated. This process may be iterated any number of times. Examples of other search tasks searcher 250 may be directed to perform include full searches on the serving or alternate frequencies, searching of monitored neighbor cells (both inter- and intra-frequency), and searching other Radio Access Technologies (inter-RAT searching).

Signal strength estimator 280 is connected to receiver 220, and used for making various power level estimates for use in the cell selection or reselection process, as well as for use in various other processing used in communication, such as demodulation. Signal strength estimator 280 is shown as a discrete block for clarity of discussion only. It is common for such a block to be incorporated within another block, such as receiver 220 or demodulator 230. Various types of signal strength estimates can be made, depending on which signal or which system type is being estimated. In an example embodiment, various pilot signals from one or more base stations are used for signal strength estimation, examples of which are detailed below. In general, any type of channel quality metric estimation block can be deployed in place of signal strength estimator 280 and is within the scope of the present invention. The channel quality metrics are delivered to processor 260 for use in cell selection or reselection, as described herein.

Data received may be transmitted to processor 260 for use in voice or data communications, as well as to various other components. A mobile station 106 will generally be equipped with modulation and transmission components for transmitting data to one or more base stations. Additional components for supporting voice communications or data applications are well known in the art and are not shown.

Processor 260 may be a general purpose microprocessor, a digital signal processor (DSP), or a special purpose processor. Processor 260 may perform some or all of the functions of receiver 220, demodulator 230, searcher 250, signal strength estimator 280, message decoder 240, as well as any other processing required by the mobile station. Processor 260 may be connected with special purpose hardware to assist in these tasks (details not shown). Data or voice applications may be external to mobile station 106, such as an externally connected laptop computer, may run on an additional processor within mobile station 106 (not shown), or may run on processor 260 itself. Processor 260 is connected with memory 270, which may be used for storing data as well as instructions for performing the various procedures and methods described herein. Those of skill in the art will recognize that memory 270 may be comprised of one or more memory components of various types, that may be embedded in whole or in part within processor 260.

Figure 3:
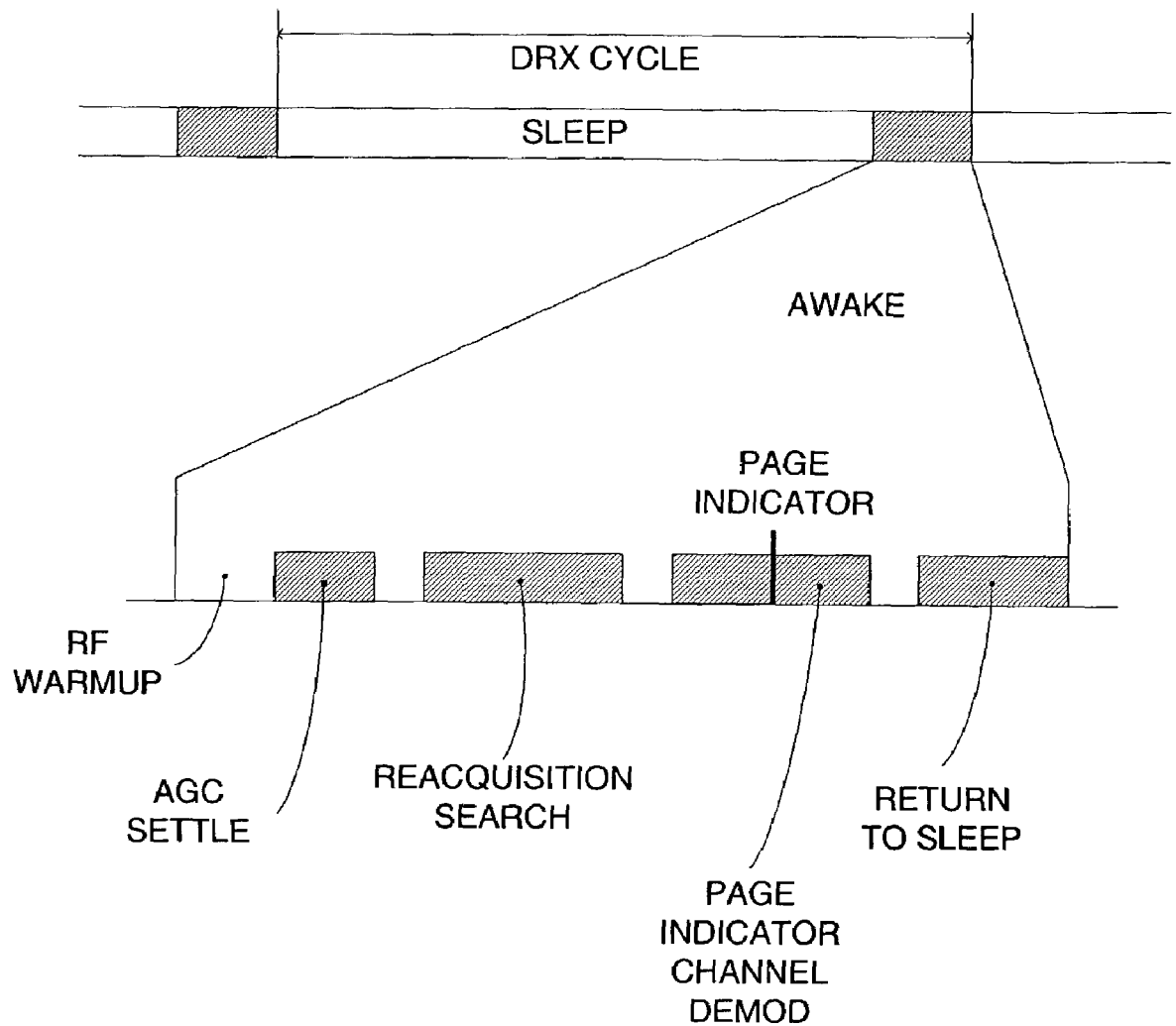
FIG. 3 depicts a simplified timing diagram of an exemplary sleep cycle.

FIG. 3 depicts a simplified timing diagram of an exemplary sleep cycle. In this example, the sleep cycle is a simplified DRX cycle. A DRX cycle is divided into two portions, a low power "sleep" state, and a higher power "awake" state, shown as the shaded portion of the DRX cycle (time durations depicted in FIG. 3 are not drawn to scale). As stated above, it is desirable to minimize the amount of time during each DRX cycle spent in the awake state, so as to minimize overall power consumption, increase standby times, and so forth. The awake portion of the DRX cycle has a magnified detail section shown. Included in the detail section are typical tasks that may need to be performed in the awake portion of a sleep (or idle) mode. The tasks shown are examples only, included for discussion purposes. They form neither an exhaustive nor a minimum list. Various blocks of time are labeled, some of which are shaded. Gaps are shown between shaded blocks to indicate times in which setup tasks for the next block are performed or post-processing from the previous block can take place. Those of skill in the art will recognize that myriad configurations of mobile stations can be deployed, an example of which was detailed above with respect to FIG. 2, and various tasks and instructions to perform waking up, demodulating, and returning to sleep will vary according to the components deployed and which components are activated during the various portions of the cycle.

In this example, the Radio Frequency (RF) components (i.e. receiver 220), shut down during the sleep portion of the DRX cycle, are activated and given time to warm up. Subsequent to RF warmup, a signal, such as an interrupt, can activate one or more processors (i.e. processor 260). A shaded block of time is shown to allow an Automatic Gain Control (AGC) loop to converge and settle. The following gap can be used to prepare the processor and search components (i.e. searcher 250) for reacquisition search. During reacquisition search, an attempt to locate the previous serving cell is made. The precise location of that cell may not be known due to timing drift associated with the sleep portion of the cycle. Changes in the communication channel, such as movement of the mobile station or relative location of obstacles, may also cause variance in the timing of the serving cell. Or, the serving cell may no longer be accessible due to fading or the mobile station moving out of reach. Reacquisition search will be detailed further below with respect to FIGS. 4–6.

In this example, reacquisition search has successfully located the serving cell. The gap following reacquisition search can be used to prepare the mobile station to demodulate the page indicator channel (PICH). For example, finger assignment based on search results can be made, and so forth (i.e. using demodulator 230). The next shaded block indicates PICH demodulation. The thick line shown identifies the page indicator bit associated with the example mobile station. If a page is directed to the mobile station, idle mode will be abandoned and the appropriate active communication will take place. For example, an incoming voice or data call may ensue. When the page indicator indicates no page is directed to the mobile station, the mobile station may return to sleep. The subsequent gap may be used to prepare various components to return to sleep, as shown in the following shaded block. Example steps include shutting down RF circuitry, recording state information, such as serving cell parameters for use in the subsequent DRX cycle, preparing the processor and/or other hardware for sleep, and so forth.

Not shown in FIG. 3, but detailed further below, is the case where reacquisition search does not locate the serving cell in time to receive the page indicator bit. In this case, the remainder of the awake cycle will be used to perform any additional searching, cell reselection, out-of-service procedures, or the like, as necessary. Subsequent to such processing, the mobile station once again enters the low power sleep state for the next DRX cycle.

Figure 4:
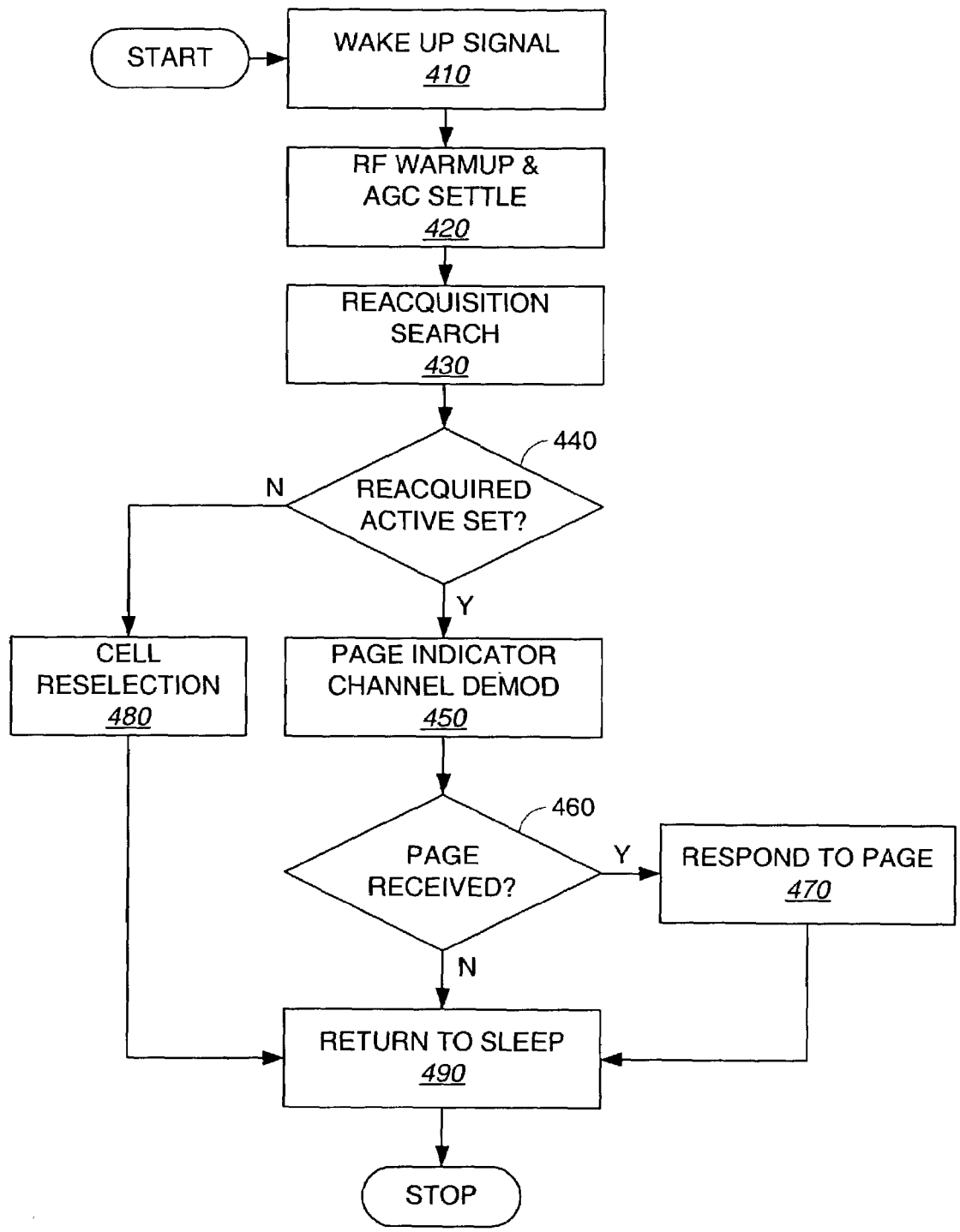
FIG. 4 depicts an example flowchart of the wake-up portion of a sleep cycle.

FIG. 4 depicts an example flowchart of the wake-up portion of a sleep cycle. The process shown is compatible with the timeline depicted in FIG. 3. The various steps described are examples only. Those of skill in the art will readily alter the order, insert or delete steps, or otherwise adapt the teachings herein to various embodiments within the scope of the present invention.

The process begins in step 410. A wake up signal is generated that indicates to one or more portions of the mobile station to exit the low-power, or sleep, state. Note that, although one wake up signal step is shown in FIG. 4, various components may wake up at different times. For example, the RF components may wake up first, to warm up, followed by a processor, to continue operations once the RF circuitry is ready for use. These details are not shown. The process then moves to step 420.

In step 420, the RF components warm up, and the AGC circuit is given time to settle. As stated above, steps 410 and 420 are examples only, provided for clarity of discussion. Proceed to step 430.

In step 430, reacquisition search is performed. Reacquisition search is used to attempt to locate the serving cell that was active during the previous cycle, such as a DRX cycle, before the mobile station went to sleep. Example reacquisition search techniques are detailed further below with respect to FIGS. 5–9. Proceed to decision block 440.

In decision block 440, if the reacquisition search made in step 430 is successful in relocating the previous serving cell, or active set, then proceed to step 450, where the page indicator channel is received and demodulated. If the serving cell is not reacquired in reacquisition search, as determined in decision block 440, then some form of cell reselection may be in order, so proceed to step 480. Note that, as described below, a cell may be "acquirable", in that its signal is received with discernable signal strength, strength perhaps even sufficient for communication at a certain level, yet the acquisition is deemed to fail if various criteria are not met. Example criteria are detailed further below. In step 480, perform cell reselection as necessary, then proceed to step 490 and return to sleep for the next DRX cycle. Then the process stops.

In step 450, the page indicator channel is received and demodulated. It is desirable to successfully demodulate the page indicator bit designated for the mobile station. (Note that alternate embodiments may utilize different paging schemes and/or messages. Step 450 may be substituted with a step to perform any type of receiving or demodulation of a signal or message directed to the mobile station to indicate that idle mode should be exited. These alternate embodiments fall within the scope of the present invention.) After demodulating the page indicator channel, proceed to decision block 460.

In decision block 460, if the page indicator channel indicates that a page is received, proceed to step 470. In step 470, the mobile station responds to the page. Any imaginable response to a page can be deployed within the scope of the present invention. A typical example would be that the mobile station is receiving an incoming voice or data call. In this case, the mobile station will exit idle mode and perform whatever active communications are appropriate. When the appropriate response to the page has been made, it may be that the process returns to idle mode (although this is not mandatory, as will be recognized by those of skill in the art.) In this case, the process proceeds to step 490, where the mobile station returns to sleep. Then, as before, the process can stop.

If, in decision block 460, no page is received for the mobile station, then active communication is not necessary. The process proceeds to step 490, where the mobile station returns to sleep, and then the process stops.

Since one object of the present invention is to allow the percentage of the idle or sleep cycle spent awake to be reduced, it may be desirable in various embodiments to time the wake up signal to precede the page indicator bit by the minimum amount of time required to successfully perform reacquisition under certain circumstances (i.e., average search time, etc.). Thus, a mobile station carrying out the process shown can wake up, perform steps necessary to prepare for and attempt reacquisition, then immediately determine if a page is received. In cases where no page is received, the mobile station can quickly return to sleep, thus maximizing the amount of time spent in low-power mode. In such embodiments, when the previous serving cell is not located, there may not be enough time allocated for the mobile station to perform additional searching or cell reselection, before the page indicator bit arrives for that mobile station. However, cell reselection can still be performed. Subsequent to cell reselection, the page indicator bit will not be immediately forthcoming, and the mobile station can return to sleep for the next DRX cycle. The page indicator bit can be rechecked during the active phase of the next DRX cycle, using a process such as that just described with respect to FIG. 4.

In step 490, the mobile station returns to sleep. Preparing to return to sleep may entail saving settings for use in reacquisition during the next DRX cycle, as well as various other tasks known in the art. The step of returning to sleep may be carried out differently depending on the step from which the process arrived at step 490. For example, beginning sleep mode, following active communications, such as may be carried out in step 470, may be different than reentering sleep mode after checking the page indicator bit, as shown in steps 450–460. Cell reselection, as shown in step 480, may also require different steps to be performed before the mobile station enters low power mode. Any conceivable method for reentering sleep mode can be deployed within the scope of the present invention.

Figure 5:
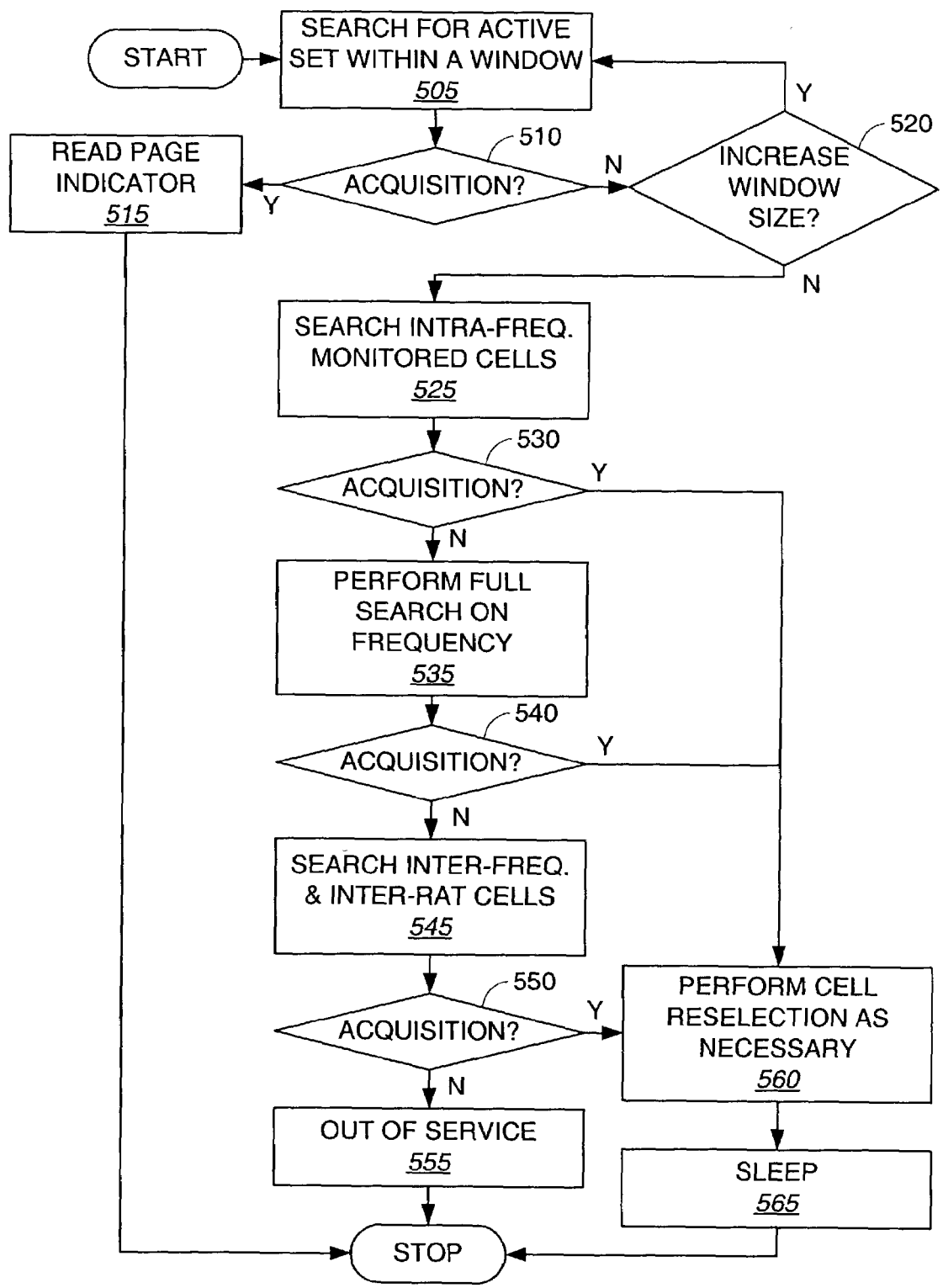
FIG. 5 depicts an embodiment of a reacquisition procedure.

FIG. 5 depicts an embodiment of a reacquisition procedure. This example embodiment illustrates various aspects of the invention. Those of skill in the art will recognize that the steps shown in FIG. 5 are neither exhaustive nor required in any particular embodiment. FIG. 5 will be described with reference to a W-CDMA system, but those of skill in the art will readily adapt one or more of the steps shown to various alternate systems, examples of which are disclosed above. This process can be adapted for use as step 430 in FIG. 4, and portions of the process may be carried out as part of steps 450, 480, or 490, among others, as described further below.

The process begins in step 505, where the previous serving cell, or the previous active set, is searched within a predetermined window. The window size may be selected such that the desired cells can be located quickly, accounting for frequency drift or other channel changes within certain expected parameters. Once the window search is performed (for example, using a searcher such as searcher 250), proceed to decision block 510. In decision block 510, if the cell or cells desired are located, acquisition is successful, proceed to step 515. If not, proceed to decision block 520. Various methods and techniques for determining if acquisition is successful are known in the art. Example techniques are detailed further below with respect to FIGS. 6–9.

In decision block 520, the window size may be expanded. In any given embodiment, any number of iterative searches over various window sizes can be performed. The window size may be increased, including the previous window, to allow for repeat tests of the previous window in addition to new offsets. Alternatively, a new window that is non-overlapping with or partially overlapping with the previous window can be selected. Of course, the previous window may also be repeated without modification. Furthermore, an embodiment may be deployed with only a single window search to locate the previous serving cell. If an additional window is to be searched, as determined in decision block 520, proceed back to step 505 to perform the next window search. If the number of desired window searches has been exhausted, proceed to step 525.

Step 515 is reached once successful acquisition occurs in any of the iterative window searches, determined in decision block 510. In step 515, the page indicator for the mobile station is read to determine if additional communication is required, or, in the alternative, whether the mobile station can reenter the low-power phase of the sleep cycle. Step 515 may be included as part of step 450, described with respect to FIG. 4, above. Then the reacquisition process can stop.

Step 525 is reached if none of the window searches performed in step 505 have resulted in successful acquisition. In this example, the current frequency is searched for other cells. The current frequency is searched to avoid the need to retune the RF circuitry or other components to another frequency, and any time delay associated with such retuning. In this example, the intra-frequency monitored cells are searched which are contained in the monitored list, described in further detail with respect to FIG. 6, below. Proceed to decision block 530.

In decision block 530, if the intra-frequency search of monitored cells has yielded a successful acquisition, proceed to step 560. If not, proceed to step 535. In step 535, a full search may be performed on the current frequency. Again, the current frequency is searched to avoid retuning to another frequency. Various searching techniques are known in the art, some of which are specific to the type of system deployed, and any such technique can be deployed as the full search in step 535. In a W-CDMA system, for example, a step 1/2/3 search can be deployed, techniques for which are known in the art. After the full search is performed, proceed to decision block 540.

In decision block 540, if the full search resulted in a successful acquisition, proceed to step 560. If not, proceed to step 545. In step 545, various other searches can be performed. Examples include inter-frequency searches and searches of other radio access technologies (inter-RAT searches). Windowed searches for known cells (including iterative searches such as described above) or full searches for any neighboring cell can be searched on one or more alternative frequencies and/or RATs. These example searches may entail the mobile station tuning to alternate frequencies or using differing search techniques applicable to other RATs. For example, a mobile station searching for W-CDMA cells may also search for neighboring GSM cells. Any system technology supported by the mobile station can be searched in step 545. The cells searched in step 545 may be one or more cells from the monitored list, for example. Once the searches are completed, proceed to decision block 550.

In decision block 550, if one or more searches performed in step 545 results in a successful acquisition, proceed to step 560. If not, proceed to step 555. Step 555 may be deployed for situations in which no cell is available to the mobile station, i.e., the mobile station is out of service. Various techniques and procedures for handling out of service conditions are known in the art. The mobile station may perform an alternate acquisition procedure, such as that performed upon initial power-on. Or, the mobile station may return to sleep for one or more DRX cycles to conserve power while awaiting a change in channel conditions such that communication with one or more base stations can be reestablished. This latter example would not require step 555, but step 565, described below, could be entered from decision block 550 when acquisition is unsuccessful (details not shown). Once the out-of-service procedure appropriate for a given embodiment is performed, the process may stop.

In step 560, cell reselection (or idle mode handoff) can be performed to one of the cells identified in step 525, 535, or 545, as applicable. In some cases, cell reselection may not be necessary as the previous serving cell was reacquired during one of those steps (although such acquisition was not successful in step 505). After cell reselection, proceed to step 565 where the mobile station returns to sleep. The example embodiment depicted in FIG. 5 is drawn to indicate the assumption that the page indicator for the current DRX cycle will have already passed if acquisition in step 505 is unsuccessful. Thus, when incorporated with a process such as that depicted in FIG. 4, the time between the wake up signal (step 410) and the arrival of the page indicator is tailored to allow the searching of one or windows (steps 505–520), and no more. As will be apparent to those of skill in the art, alternate embodiments could be deployed to allow time for one or more searches of steps 525, 535, or 545 to be completed, plus reselection, if necessary, prior to arrival of the page indicator. In such alternatives, successful acquisition in decision blocks 530, 540, or 550, respectively, could result in the process proceeding to step 515 for page indicator reading, as described above (details not shown). In any embodiment, once step 565 is reached, the mobile station prepares to return to sleep and may reattempt to read the page indicator during the awake portion of the next DR-X cycle. Once the mobile station is prepared for sleep, the process may stop. Note that step 565 may be incorporated with step 490 when the process of FIG. 5 is incorporated with a process such as that described with respect to FIG. 4, above.

FIGS. 6–8B describe various example embodiments for performing cell reselection. Cell reselection may be performed when the previous active set or serving cell is not located during reacquisition search, such as described above with respect to steps 480 and 560. In addition, cell reselection may be performed when reacquisition of the serving cell is successful. For example, the W-CDMA standard provides certain requirements for the quality of the received signal of the serving cell. When those quality requirements are not met for a pre-determined number of DRX cycles, cell reselection may be indicated. Furthermore, searching neighbor cells of various types, intra-frequency, inter-frequency, inter-RAT, and so forth, may be prescribed periodically to maintain information about the available neighbor cells. Again, for example, the W-CDMA standard sets forth requirements for performing such searches and maintaining a list of neighbor cells, referred to as the monitored list. The example cell reselection methods described below with respect to FIGS. 6–8B include aspects for limiting unnecessary cell reselection, to minimize time spent in awake mode, thus increasing standby time. They are described in co-pending U.S. patent application Ser. No. 10/317385, entitled "LIMITING CELL RESELECTION BASED ON PILOT POWER", filed herewith, and assigned to the assignee of the present invention. The methods described with respect to FIGS. 6–8B may be used in conjunction with the methods described in FIGS. 4, 5, and 9, herein, as will be apparent to those of skill in the art, although their use is not required. Similarly, reselection and neighbor search techniques that do not limit cell reselection, as described below, may also be deployed within the scope of the present invention.

Figure 6:
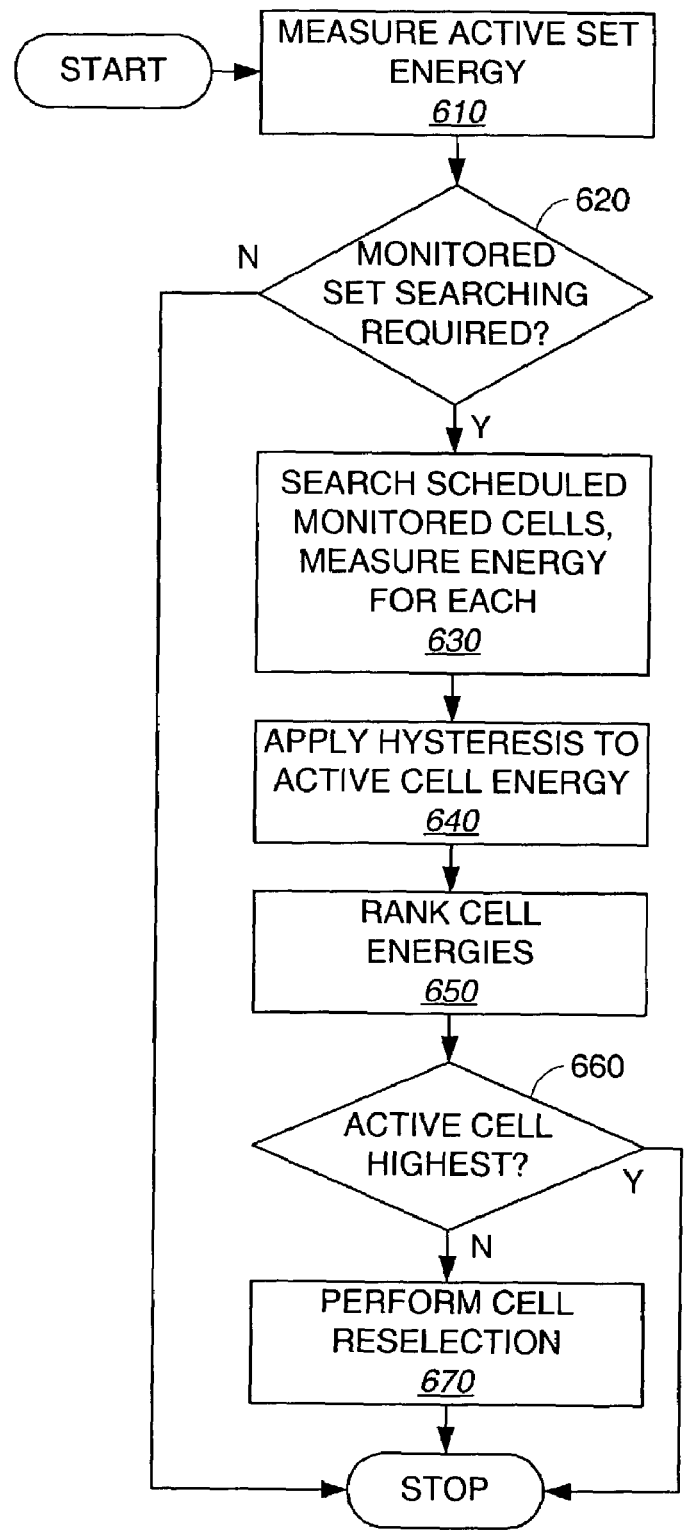
FIG. 6 is a flowchart of an embodiment of a method of cell reselection.
Figure 7:
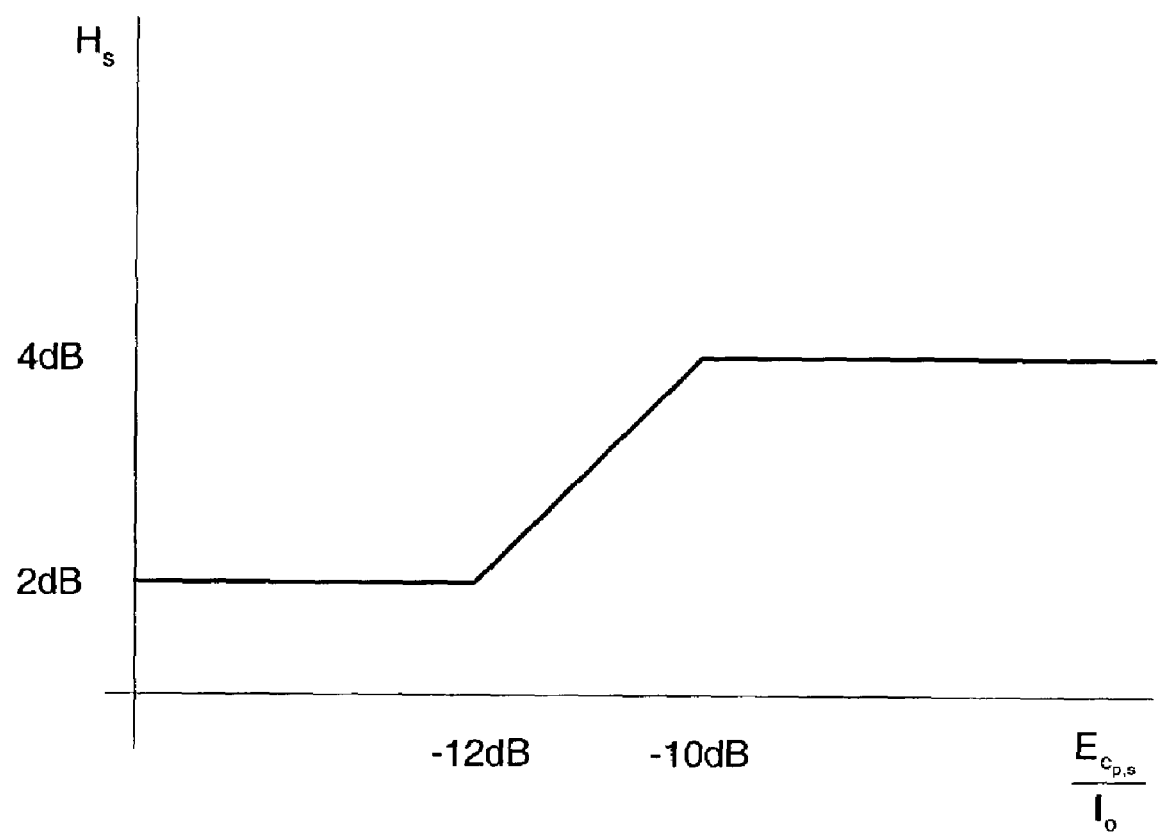
FIG. 7 depicts a graph of a hysteresis function of received pilot power for use with a cell reselection method.
Figure 8A:
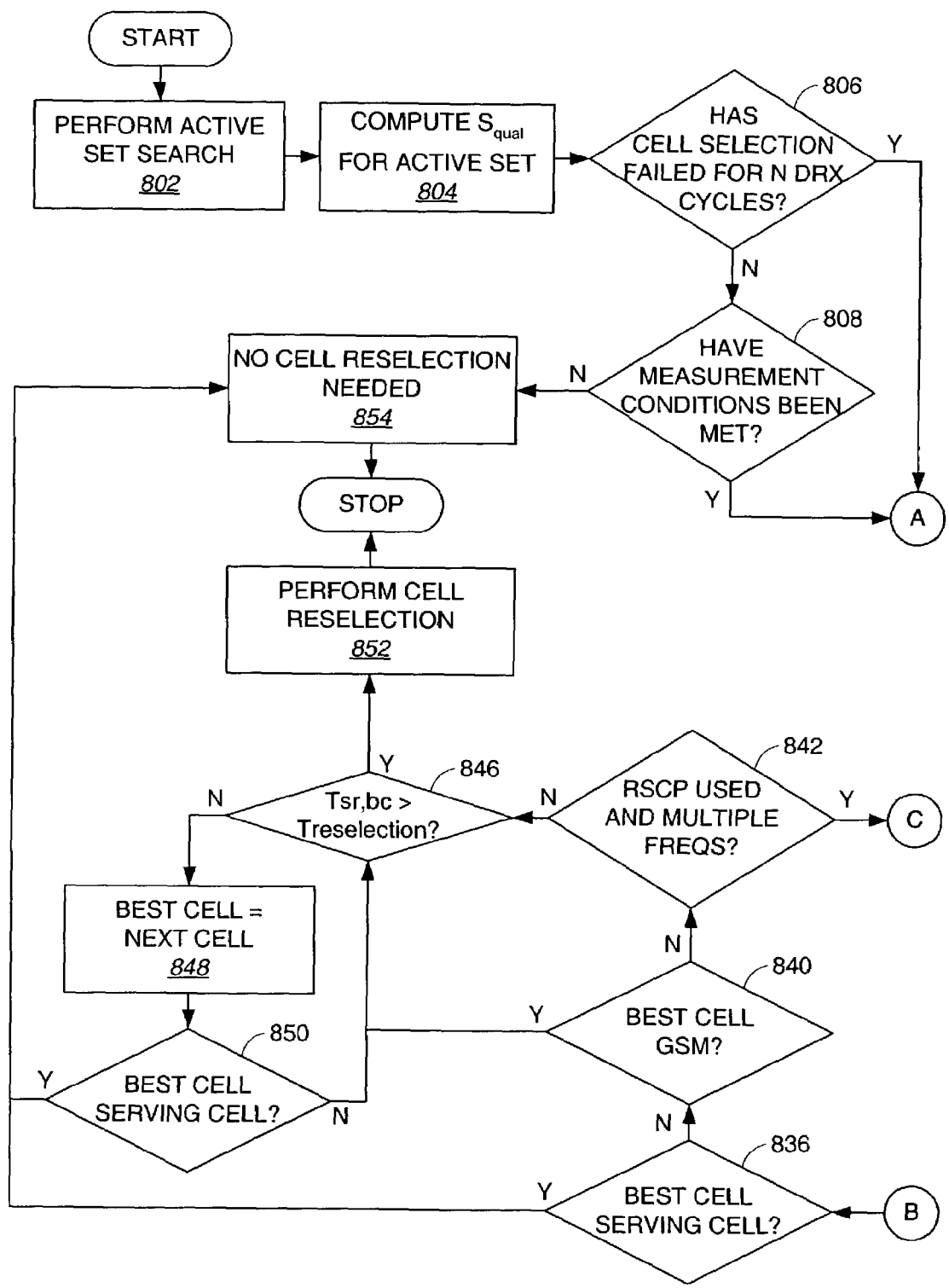
FIGS. 8A and 8B are a flowchart of an embodiment of an alternate method of cell reselection.
Figure 8B:
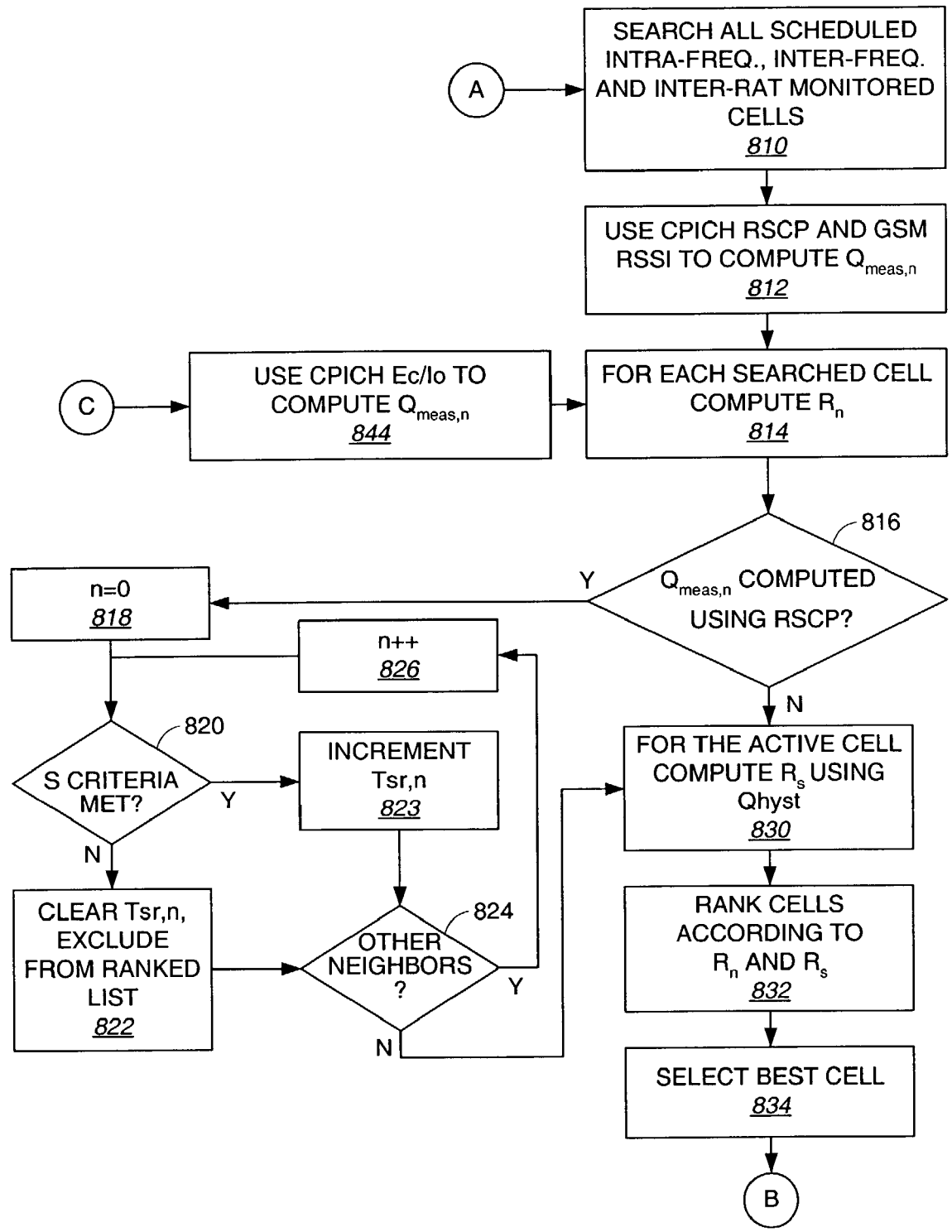
Figure 9:
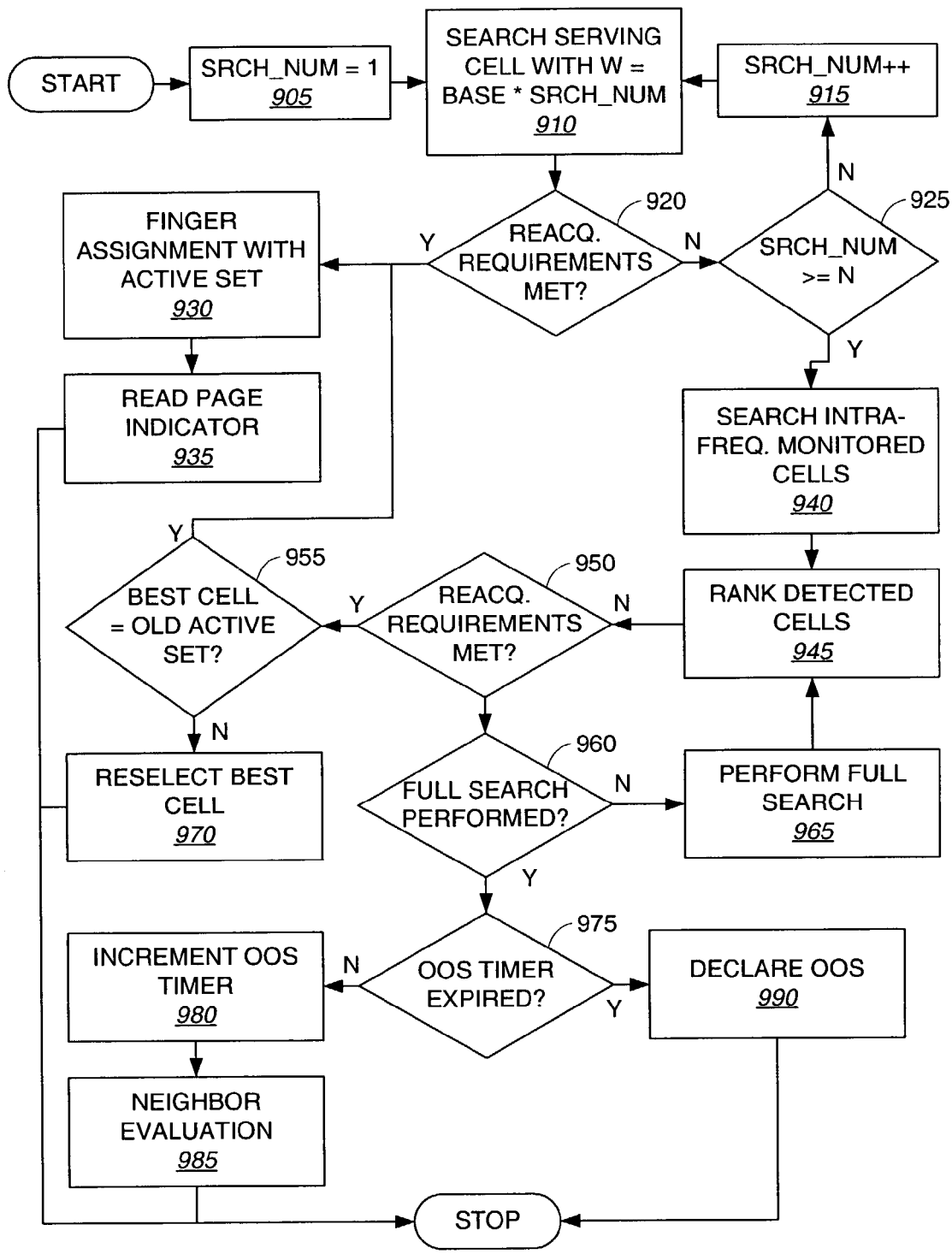
FIG. 9 depicts another embodiment of a reacquisition procedure.

The techniques described for searching the active set as well as neighbor cells of various types, for assessing the quality of various cells, and for making a cell reselection serve as examples that can be deployed where appropriate in methods such as those described in FIGS. 4, 5, and 9, regardless of whether a method such as described in FIG. 6 or 8 is deployed in conjunction therewith. The reacquisition search embodiment of FIG. 9 is described below using the W-CDMA as an example system, and therefore the various W-CDMA parameters described below may also be used as example parameters in the discussion pertaining to FIG. 9

FIG. 6 depicts an embodiment of a method of limiting cell reselection based on received pilot power. In the example embodiment, the method of FIG. 6 is performed once during each DRX cycle. The process begins in step 610, after the period during which reception was disabled. The received energy of the current active set, i.e., the active set used during the previous DRX cycle, is measured. Proceed to decision block 620.

In decision block 620, a determination is made whether or not searching of the monitored set is required. Under certain conditions, if the measured energy of the active set is sufficient, there is no need to determine the quality of alternate base stations indicated in the monitored set, and the process can stop. No cell reselection will be required, and the current active set remains the active set. If searching of the monitored set is indicated, proceed to step 630. Steps 630-670 may be used to make a cell reselection decision, limited to avoid excessive reselection. Various techniques for determining the need for additional searching are known in the art, an example of which is detailed below with respect to FIGS. 8A and 8B. Any technique, known or developed in the future, may be deployed with the cell reselection methods described herein.

In step 630, searching is performed on all scheduled cells in the monitored list, and the energy is measured for each. The definition of the monitored set may vary, and, as such, a subset of the available cells may be searched in this step. For example, a subset of cells on the current frequency may be searched, or on multiple frequencies, or even over multiple systems (neighboring GSM cells, for example). Various methods for determining the desired set of monitored cells for searching in step 630 are known, examples of which are detailed below with respect to FIGS. 8A and 8B, and any method may be deployed within the scope of the present invention. In this example, the energy of the pilot of each cell in the monitored list is measured. Once this list of candidate energies is measured, proceed to step 640.

In step 640, a hysteresis value is applied to the measured energy of the current active set. The hysteresis value may be comprised of one or more components. For example, one of the components of the hysteresis value may be determined in response to the measured energy in one or more pilots of the active set. Another component, for example, may be signaled by the system to the mobile station. Utilizing at least one component that is determined in response to the current channel conditions, as measured by the mobile station, allows cell reselection to be dynamically adapted in response to the quality of the current active set as seen by the mobile station. Thus, cell reselection can be made more likely when conditions are relatively poor, thus increasing the likelihood of locating a more suitable cell. When conditions are relatively good, reselection can be made less likely, thus avoiding cell reselections that may provide little or no improvement.

The hysteresis value can be any function of the received signal strength of the currently selected cell. In this embodiment, the hysteresis value, $H_s$, is determined according to equation 1:

$$H_s = \begin{cases} 2 \text{ dB} & \text{when} \quad \frac{Ec_{p,s}}{I_o} < -12 \text{ dB} \\ -\left(10 + \frac{Ec_{p,s}}{I_o}\right) + 2 \text{ dB} & \text{when} \quad -12 \text{ dB} < \frac{Ec_{p,s}}{I_o} < -10 \text{ dB} \\ 4 \text{ dB} & \text{when} \quad \frac{Ec_{p,s}}{I_o} > -10 \text{ dB} \end{cases} \quad (1)$$

where $Ec_{p,s}/I_o$ is the chip energy over interference ($E_c/I_o$) of the Common Pilot Channel (CPICH), measured by the searcher (in dB). $H_s$ is plotted in FIG. 7. Those of skill in the art will recognize that equation 1 is an example only, and that any function of received signal strength can be used to determine hysteresis within the scope of the present invention.

Once the hysteresis value is added to the energy of the currently selected cell in step 640, proceed to step 650. In step 650, the cell energies of the monitored set and the current active set are ranked according to measured energy (including the hysteresis-modified energy of the active cell). Proceed to decision block 660. In decision block 660, if the current active cell's energy, as modified, is the highest ranked energy, no cell reselection is required and the process can stop. If not, proceed to step 670 to perform cell reselection to the cell from which the highest energy has been received. After cell reselection is completed, the process terminates.

In this embodiment, the method described with respect to FIG. 6 is performed once during each DRX cycle. The mobile station "wakes up" from the low power state during which receiving is deactivated, determines whether cell reselection is in order, in accordance with the method described, performs any additional processing required (such as monitoring the paging channel to determine if an incoming call is being directed to the mobile station), and then reenters the low power state, or "sleeps", for another DRX cycle, if appropriate. The reduction in cell reselections, based on channel information available to the mobile station, allows the mobile station to avoid remaining in the higher-power "awake" state any longer than necessary, thus reducing power consumption and increasing battery life or standby time. At the same time, the mobile station maintains communication with a suitable base station during idle mode, as cell reselection is adapted in response to changing channel conditions experienced by the mobile station.

FIGS. 8A and 8B depicts an exemplary method of cell selection suitable for mobile stations operable with both W-CDMA and GSM systems, among others. Cell selection and reselection is based on computation of the S criteria, $S_{qual}$ and $S_{rxlev}$, given in equations 2 and 3:

$$S_{qual} = \frac{Ec_p}{I_o} - Q_{qualmin} \quad (2)$$

$$S_{rxlev} = Ec_p - Q_{rxlev\ min} - \max(UE\_TXPWR\_MAX\_RACH - P\_MAX, 0) \quad (3)$$

where:
$Ec_p/I_o$ is the measured CPICH Ec/Io by the searcher (in dB);
$Q_{qual\ min}$ is the minimum required quality level of the cell;
$Ec_p$ is the measured CPICH Received Signal Code Power (RSCP) (in dBm);
$Q_{rxlev}$ min is the minimum required received level in the cell (in dBm);
UE_TXPWR_MAX_RACH is the max power the UE, or mobile station, may use when transmitting on the Random Access Channel (RACH); and
P_MAX is the maximum transmit power of the UE, or mobile station.

The W-CDMA standard mandates that the mobile station perform cell selection on the serving cell by computing the S criteria every DRX cycle. The mobile station is expected to monitor the results to ensure that the conditions for cell selection are met. If the cell selection criteria S do not fulfill cell selection requirements for a preset number, N, of consecutive DRX cycles, the mobile station should initiate measurements on the neighbor cells (i.e. the monitored list) and attempt to reselect to another cell, regardless of other rules limiting the mobile station from measuring other cells. The embodiment depicted in FIGS. 8A and 8B incorporate the W-CDMA standard provisions as well as various aspects of the present invention. The method can be performed during each DRX cycle subsequent to the mobile station coming out of the low power state during which reception was disabled.

The process begins in step 802, where a search is performed to locate and measure the energy of the pilot of the active set. Proceed to step 804 to compute the S criteria, given in equations 2 and 3 above. Then proceed to decision block 806, to test if cell selection has failed for the current active set. Cell selection fails when the S criteria, $S_{qual}$ and $S_{rxlev}$, are less than zero. In this example, cell selection must fail for N consecutive DRX cycles to initiate a cell reselection. If cell selection has not failed, or has not failed for the requisite N cycles, proceed to decision block 808. If cell selection has failed for N consecutive cycles, proceed to step 810 to begin the reselection process.

In decision block 808, even if cell selection has not failed for N consecutive DRX cycles, as tested in decision block 806, if other criteria are met, the cell reselection process may still be initiated. Any measurement criteria can be deployed for initializing a cell reselection process, as will be recognized by one of skill in the art.

In the exemplary embodiment, three separate types of monitored cells may be scheduled for searching to determine if cell reselection should proceed (described below). If the serving cell's $S_{qual}$, $S_{qual,s}$, falls below the parameter $S_{intrasearch}$, then intra-frequency measurements of monitored cells will be scheduled. $S_{intrasearch}$ may be specified over-the-air by the system. Note that in the exemplary embodiment, a floor is set on $S_{intrasearch}$ by setting it to the maximum of any signaled $S_{intrasearch}$ and $S_{min}$, where $S_{min}$ is computed using the equation for $S_{qual}$ with CPICH $E_c/N_o$ set to −8 dB. If $S_{qual,s}$ falls below the parameter $S_{intersearch}$ then inter-frequency measurements of monitored cells will be scheduled. $S_{intersearch}$ can be signaled over-the-air by the system. If $S_{qual,s}$ falls below the parameter Sinter-RAT, then alternative Radio Access Technologies (RATs), or inter-RAT measurements of monitored cells will be scheduled. One example inter-RAT search may be to search for neighboring GSM cells, although any alternative system could be scheduled for search within the scope of the present invention. Note that the monitored set need not contain cells of any particular type. The monitored set may contain any combination or subsets of the three types. It follows that the scheduled set of cells may be a subset of the monitored set, regardless of the satisfaction of the three tests just described. If any of the above criteria are satisfied, then proceed to step 810 to begin the process of determining whether cell reselection will take place, as described below. If none of the above criteria are satisfied, then proceed to step 854, where the Radio Resource Controller (RRC) is signaled that no cell reselection is necessary. The process can then stop.

In step 810, all the scheduled intra-frequency, inter-frequency, and inter-RAT monitored cells are searched. Which cells to search can be determined using the criteria just described with respect to decision block 808. Note further that, if no parameter $S_{intrasearch}$ has been specified by the system, then all intra-frequency cells in the monitored list will be searched. If no parameter $S_{intersearch}$ has been specified by the system, then all inter-frequency cells in the monitored list will be searched. If no parameter $S_{inter-RAT}$ has been specified by the system, then all inter-RAT cells in the monitored list will be searched. Proceed to step 812.

In step 812, the quantity $Q_{meas,n}$ is computed for the n neighbor cells scheduled from the monitored list. $Q_{meas,n}$ is an indicator of the received signal power from each neighbor, and in the example embodiment, it may be computed in two different ways, as described further below. Those of skill in the art will recognize that any power measurement indicator can be used within the scope of the present invention. During this step 812, $Q_{meas,n}$ is an absolute power measurement, measured in dBm, which is useful when comparing results between the serving cell, intra-frequency neighbor cells, inter-frequency neighbor cells, as well as inter-RAT neighbor cells. It is computed as the Received Signal Code Power (RSCP) of the CPICH for W-CDMA cells, and the Received Signal Strength Indicator (RSSI) for GSM cells. RSCP is computed as $E_c/I_o+I_o$, which normalizes the results for varying interference levels across multiple frequencies. Once $Q_{meas,n}$ is computed for all the searched neighbors, proceed to step 814. $Q_{meas,n}$ can alternately be computed as CPICH $E_c/I_o$, measured in dB, which will be detailed below with respect to step 844.

In step 814, for each searched cell, compute a ranking value $R_n$, defined as $Q_{meas,n}$−Qoffset$_n$. Qoffset$_n$ is specified over-the-air by the system, and is set to Qoffset1$_n$ when CPICH RSCP or RSSI (for GSM cells) is used to compute $Q_{meas,n}$, as in step 812. Qoffset$_n$ is set to Qoffset2$_n$ when CPICH $E_c/I_o$ is used to compute $Q_{meas,n}$, as in step 844, detailed below. Qoffset is specified in dBm for Qoffset1 and in dB for Qoffset2. While use of Qoffset may assist in reducing undesirable cell reselection, particular use of the parameter is not specified by the standard, thus it may not be deployed effectively for limiting cell reselection. Furthermore, it is not responsive to the current state of the communication channel between the serving cell and the mobile station, so it cannot adapt to provide varying levels of cell reselection sensitivity. Proceed to decision block 816.

Decision block 816 provides a branch for the process depending on how step 814 was entered. If $Q_{meas,n}$ was computed using RSCP (or RSSI), as specified in step 812, then proceed to step 818. If not, i.e., step 814 was reached through step 844, proceed to step 830.

In step 818, set n=0. In the loop formed by steps 820–826, n will be used as an index to test the quality of the searched neighbor cells. Proceed to decision block 820, where the S criteria, defined above in equations 2 and 3 are calculated for the $n^{th}$ neighbor. If $S_{qual}$ or $S_{rxlev}$ for the $n^{th}$ neighbor are less than zero, then that neighbor does not meet cell selection criteria. Note that $S_{qual,n}$ is not computed for GSM cells, so the test for $S_{rxlev}$ is used exclusively. Proceed to step 822 and remove the cell from the list of searched neighbor cells. In addition, a timer value Tsr,n is cleared, which is an indicator of how long a cell has met the selection criteria, the use of which is detailed below. If the cell selection criteria are met for the neighbor, proceed to step 823 and increment Tsr,n.

From either step 822 or 823, proceed to decision block 824 to determine if there are any additional neighbors in the list. If so, proceed to step 826, increment n, and return to decision block 820 to test the next neighbor with the cell selection criteria. If not, proceed to step 830.

In step 830, compute the ranking value, $R_s$, for the serving cell. $R_s$ is computed as $Q_{meas,s}$+Qhyst, where $Q_{meas,s}$ is computed for the serving cell using the energy metric used to measure the neighbor cells, i.e., as defined for step 814 or step 844. Qhyst is set to Qhyst1 when the measurement quantity used for ranking is CPICH RSCP, where Qhyst1 can be signaled over-the-air by the system. Qhyst is set to the maximum of Qhyst2 and $H_s$ when the measurement quantity is CPICH $E_c/I_o$. Qhyst2 can be signaled over-the-air by the system. $H_s$ can be computed according to any hysteresis equation, as will be recognized by those skilled in the art. In this example embodiment $H_s$ is computed according to equation 1. Thus, the system can introduce hysteresis by supplying Qhyst2 over-the-air. However, a floor on the hysteresis value is introduced by $H_s$. As described above with respect to FIG. 6, using $H_s$ allows limiting cell reselection in response to changing channel conditions, making reselection less likely when the channel is relatively good, and more likely when the channel is relatively poor. Once the ranking value $R_s$ is computed for the serving cell, proceed to step 832.

In step 832, rank the serving cell and the measured neighbor cells according to their ranking values, $R_s$ and $R_n$.

Proceed to step 834 to select the best cell (identified below with subscript bc) as the cell with the highest rank. Proceed to decision block 836.

In decision block 836, if the best cell is the current serving cell, then proceed to step 854, and indicate that no cell reselection is needed, as described above. If the best cell is a cell other than the current serving cell, additional steps are taken to determine whether a cell reselection should take place. Proceed to decision block 840 to begin that portion of the process.

In decision block 840, if the best cell is a GSM cell, proceed to decision block 846. If not, proceed to decision block 842.

In decision block 842, if the prior pass through step 814 used CPICH RSCP for $Q_{meas,n}$ i.e., step 814 was entered from step 812, and there are multiple frequencies in the ranked monitored list, then the list will be re-ranked using CPICH $E_c/I_o$. In this case, the process continues to step 844. If step 844 has already been entered during the process for the current DRX cycle, or there is only one frequency in the ranked list corresponding to the monitored set, then the process continues to decision block 846. Recall that RSCP=$E_c/I_o$+$I_o$. $I_o$ may be different across different frequencies, so using RSCP normalizes this difference when an absolute power level is desired. If only one frequency is used in the ranked list, then a second pass using $E_c/I_o$ will not alter the ranking generated with RSCP.

In step 844, as mentioned preciously, CPICH RSCP will be used for $Q_{meas,n}$. Proceed to step 814 and re-compute the ranking values $R_n$ for the monitored list (as modified for any cells which failed the cell selection criteria in the loop formed by steps 818–824, described above). Then the process proceeds to decision block 816, where the path to step 830 will be taken since RSCP is no longer the measurement value used for the ranked list. The monitored cells and the serving cell (modified with hysteresis in step 830) will be re-ranked in step 832, and the best cell selection will be made again in step 834. In some cases, a different best cell will prevail, and decision block 836 and possibly decision block 840 will be revisited and performed as described above. If the current serving cell becomes the new best cell, then the process proceeds to step 854, described above, and cell reselection will not be needed. If the same best cell is still selected, or another best cell, different from the current serving cell, is selected, then the process will proceed to step 846. The process may branch through decision block 840 if the best cell is a GSM cell, or through decision block 842 if the best cell is not a GSM cell. The process will not branch from decision block 842 to step 844 during this second pass, as described above.

When the best cell is different than the serving cell, decision block 846 will be reached regardless of whether a second pass was made, or whether or not the best cell is a GSM cell. In decision block 846, Tsr,bc must be greater than the parameter Treselection, which indicates the minimum time a cell must have met cell selection criteria before it can be selected (via the reselection process) as the new serving cell. Treselection can be transmitted over-the-air from the system. If the minimum time indicated by Treselection has been met by the best cell, proceed to step 852. In step 852, an indication is made to the RRC that cell reselection should be made using the best cell as the new serving cell. Then the process can stop.

If the best cell does not meet the minimum time required for satisfaction of the cell selection criteria, proceed to step 848. In step 848, the next best cell, according to the ranking, is selected. If the next best cell is the current serving cell, no cell reselection is needed, and the process proceeds to step 854, described above, and then terminates. If the next best cell is not the current serving cell, proceed back to decision block 846 to test the minimum time requirement for the next best cell. The loop formed by steps 846-850 will continue until a cell is identified for reselection (and step 852 is reached), or the current cell is selected and no cell reselection is performed (i.e. step 854 is reached).

FIG. 9 depicts an embodiment of a reacquisition procedure. This example embodiment illustrates various aspects of the invention. Those of skill in the art will recognize that the steps shown in FIG. 9 are neither exhaustive nor required in any particular embodiment. FIG. 9 will be described with reference to a W-CDMA system, but those of skill in the art will readily adapt one or more of the steps shown to various alternate systems, examples of which are disclosed above. This process can be adapted for use as step 430 in FIG. 4, and portions of the process may be carried out as part of steps 450, 480, or 490, among others, as described further below. This process may further be deployed in conjunction with any of the techniques or methods described above with respect to FIGS. 6–8B, although, naturally, such deployment is not required.

The process begins in step 905, where a variable for indexing a number of search iterations, SRCH_NUM, is initialized to one. Proceed to step 910. In step 910, the serving cell is searched over a window W, defined as a base window (BASE) multiplied by SRCH_NUM. BASE can be any number, and can be variable. An example value (in chips) for the base window is BASE=64. During the initial pass through step 910, in this example, the search window W will equal BASE. Those of skill in the art will recognize that any method for determining a window size for searching may be deployed, examples of which were described above with respect to step 520. Proceed to decision block 920.

In decision block 920, a determination is made as to whether the serving cell meets reacquisition requirements. Various reacquisition requirements are known in the art, examples of which were described above with respect to FIGS. 6–8B. If the serving cell has met the reacquisition requirements, proceed to step 930. In step 930, finger assignment is made using the active set (in an alternate embodiment, not deploying a RAKE receiver, other steps, known in the art, can be performed to ready the mobile station to receive and demodulate signals from base stations in the active set). Proceed to step 935 to read the page indicator. Then the process stops. Note that steps 930–935 may be part of step 450 or step 515, when deployed with embodiments similar to those described above with respect to FIG. 4 or 5, respectively. The process terminating may then proceed to decision block 460, for example, after which the mobile station may begin communication if a page is received, or return to sleep if no page is present.

In decision block 920, if reacquisition requirements have not been met, proceed to decision block 925. In decision block 925, if the index SRCH_NUM is greater than or equal to an iteration number, N, then the maximum number of window searches has been performed in step 910. Proceed to step 940. If SRCH_NUM is less than N, proceed to step 915 and increment SRCH_NUM. Then return to step 910 to perform the next iteration using the increased window size, calculated according to W. N can be any value. In the example embodiment, N is set to 2, thus there will be two passes to search for the current active set.

Step 940 will be reached when the active set has not met the reacquisition requirements during any of the iterative window searches of step 910. In step 940, intra-frequency monitored cells are searched. The criteria used to determine whether to search intra-frequency monitored cells may be those described above with respect to FIGS. 8A and 8B, for example. Proceed to step 945.

In step 945, the detected cells are ranked. Any ranking technique known in the art can be deployed. An example ranking procedure is described above with respect to FIGS. 8A and 8B. A best cell is selected from the ranked list of cells. Proceed to decision block 950.

In decision block 950, if reacquisition requirements are met for the best cell, proceed to decision block 955. If not, additional searching may be performed. Proceed to decision block 960. Decision block 960 is used to branch to step 965 if a full search on the current frequency has not been recently performed. In this case, a full search is performed in step 965. In this example, a W-CDMA full search is performed, as described with respect to step 535, above. After full search, the process returns to step 945 and the ranking procedure is performed again.

In decision block 955, the best cell will have met reacquisition requirements. If, during the course of the various searches performed, the best cell selected is from the old active set, reselection will not need to be performed. The process then flows to step 930 for finger assignment and subsequent page indicator reading in step 935. In an alternate embodiment, if the time at which decision block 955 is reached is past the page indicator time for the mobile station, the process may terminate rather than proceeding to step 930. In this situation, the mobile station may return to sleep, for example, to await the page indicator in the next DRX cycle. These details are not shown. If, in decision block 955, the best cell is not the current serving cell, proceed to step 970 to perform reselection on the best cell. Reselection can be performed using any reselection technique. In this example, reselection is performed according to one of the techniques described with respect to FIGS. 6–8B, above. Then the process terminates. When this method is deployed with an embodiment such as that described in FIG. 4, step 970 may be part of step 480, and termination of the process may proceed to step 490 wherein the mobile station returns to sleep.

In decision block 960, if a full search has already been performed on the current frequency, then no suitable cell has been located. Proceed to decision block 975. In this example, an out-of-service procedure is deployed. A timer is maintained to determine whether or not the mobile station is out of service (OOS). If the timer expires, then proceed to step 990 and declare an OOS. In the W-CDMA specification, for example, an out of service indication is declared if a system is not located within 12 seconds. Any OOS timer value, or other method for identifying an OOS condition, can be deployed within the scope of the present invention. Various techniques for handling an OOS are known in the art, as described above with respect to step 555. In this example, an OOS is declared to an upper layer which may take further steps, i.e., to find a new system. In decision block 975, if the OOS timer has not expired, proceed to step 980 and increment the OOS timer. Then proceed to step 985 to perform neighbor evaluation. Any technique for neighbor evaluation may be deployed, examples of which are well known in the art. In this embodiment, the current frequency has been searched already, so neighbor evaluation may be performed on inter-frequency cells and/or inter-RAT cells. The neighbor searching and cell reselection, if necessary, is performed according to the methods described with respect to FIGS. 8A and 8B, above. Then the process stops. Steps 975–990 may be part of step 480, when deployed with a method such as described with respect to FIG. 4, above. In such a case, subsequent to cell reselection, the mobile station returns to sleep to await the page indicator in the subsequent DRX cycle.

The embodiments depicted in FIGS. 4–9 are only examples of methods of reacquisition utilizing aspects of the invention described herein. These examples demonstrate the applicability of these aspects to a mobile station equipped to operate with one system, or to interoperate with multiple systems, i.e. W-CDMA and GSM systems. Those of skill in the art will readily expand the principles taught with respect to FIGS. 4–9 to any number of combinations of systems, parameters, search techniques, selection requirements, and so forth, including those known in the art as well as those conceived in the future. Various modifications can be made to these embodiments within the scope of the present invention and will be readily adaptable by those of skill in the art.

It should be noted that in all the embodiments described above, method steps can be interchanged without departing from the scope of the invention. The descriptions disclosed herein have in many cases used signals, parameters, and procedures associated with the W-CDMA and GSM standards, but the scope of the present invention is not limited as such. Those of skill in the art will readily apply the principles herein to various other communication systems. Furthermore, channel quality metrics may be used other than those described, and may be measured using pilot signals from various neighboring cells, or any other signal for which a metric indicating the quality of the channels between those various cells and the mobile station may be obtained. These and other modifications will be apparent to those of ordinary skill in the art.

Those of skill in the art will understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. An apparatus comprising:
   a searcher for locating base stations; and
   a processor for accessing a base station located by the searcher on a first frequency, for entering into a low power state after accessing the base station, for directing the searcher to locate the previously accessed base station within a first search window in response to a signal indicating the end of a low power time period, for directing the searcher to locate the previously accessed base station within one or more second search windows when the previously accessed base station is not located within the first search window, and for determining the first search window and the one or more second windows based on an expected location of the previously accessed base station.

2. The apparatus of claim 1, further comprising:
   a signal generator for generating the signal indicating the end of the low power time period.

3. The apparatus of claim 1, wherein the processor directs the searcher to search for one or more base stations from a monitored list on the first frequency when the previously accessed base station is not located within the first or one or more second search windows.

4. The apparatus of claim 1, wherein the processor directs the searcher to search for any base station on the first frequency when the previously accessed base station is not located within the first or one or more second search windows.

5. The apparatus of claim 1, wherein the processor directs the searcher to search for one or more base stations from a monitored list on one or more second frequencies when the previously accessed base station is not located within the first or one or more second search windows.

6. The apparatus of claim 1, wherein the processor directs the searcher to search for one or more base stations from a monitored list on one or more alternate radio access technologies when the previously accessed base station is not located within the first or one or more second search windows.

7. The apparatus of claim 1, further comprising:
   a signal generator for generating the signal indicating the end of the low power time period to precede a page indicator bit by a minimum amount of time to successfully perform reacquisition under expected circumstances.

8. The apparatus of claim 1, wherein the first search window has a size selected such that the previously accessed base station can be located quickly given frequency drift and channel changes within expected parameters.

9. The apparatus of claim 1, wherein the one or more second windows overlap the first search window.

10. The apparatus of claim 1, wherein the one or more second windows are larger than the first search window.

11. The apparatus of claim 1, further comprising:
    a demodulator for demodulating signals from base stations.

12. The apparatus of claim 11, further comprising:
    a message decoder for decoding a page indicator from the previously accessed base station, and wherein the processor generates a signal indicating the beginning of a low power time period when the page indicator indicates no page.

13. The apparatus of claim 12, wherein the processor directs the demodulator to demodulate a signal from the previously accessed base station when the page indicator indicates a page.

14. A wireless communication device comprising:
    a searcher for locating base stations; and
    a processor for accessing a base station located by the searcher, for entering into a low power state after accessing the base station, for directing the searcher to locate the previously accessed base station within a first search window in response to a signal indicating the end of a low power time period, for directing the searcher to locate the previously accessed base station within one or more second search windows when the previously accessed base station is not located within the first search window, and for determining the first search window and the one or more second windows based on an expected location of the previously accessed base station.

15. A wireless communication system, including a wireless communication device, comprising:
    a searcher for locating base stations; and
    a processor for accessing a base station located by the searcher, for entering into a low power state after accessing the base station, for directing the searcher to locate the previously accessed base station within a first search window in response to a signal indicating the end of a low power time period, for directing the searcher to locate the previously accessed base station within one or more second search windows when the previously accessed base station is not located within the first search window, and for determining the first search window and the one or more second windows based on an expected location of the previously accessed base station.

16. A method comprising:
    accessing a base station on a first frequency;
    entering into a low power state after accessing the base station;

generating a wake-up signal at a predetermined time prior to a page indicator from the previously accessed base station;

searching for the previously accessed base station within at least one of a plurality of search windows on the first frequency in response to the wake-up signal;

demodulating the page indicator when the previously accessed base station is located within one of the plurality of search windows; and determining the plurality of search windows based on an expected location of the previously accessed base station, and wherein the predetermined time is determined according to the time to search over the plurality of search windows.

17. The method of claim 16, further comprising:
searching the first frequency for one or more base stations from a monitored list when the previously accessed base station is not located in one of the plurality of search windows.

18. The method of claim 16, further comprising:
searching the first frequency for base stations operating with radio access technology of the previously accessed base station when the previously accessed base station is not located in one of the plurality of search windows.

19. The method of claim 16, further comprising:
searching one or more second frequencies for one or more base stations from a monitored list when the previously accessed base station is not located in one of the plurality of search windows.

20. The method of claim 16, further comprising:
searching for one or more base stations operating with one or more alternate radio access technologies when the previously accessed base station is not located in one of the plurality of search windows.

21. The method of claim 16, further comprising:
generating an out-of-service indicator when no base station is located.

22. The method of claim 16, further comprising:
generating a sleep signal when the demodulated page indicator indicates no page.

23. The method of claim 16, further comprising:
performing cell reselection to a located base station when the located base station is not the previously accessed base station.

24. The method of claim 23, further comprising:
generating a sleep signal subsequent to cell reselection.

25. An apparatus, comprising:
means for accessing a base station;
means for entering into a low power state after accessing the base station;
means for generating a wake-up signal at a predetermined time prior to a page indicator from the previously accessed base station;
means for searching for the previously accessed base station within at least one of a plurality of search windows in response to the wake-up signal;
means for demodulating the page indicator when the previously accessed base station is located within one of the plurality of search windows; and
means for determining the plurality of search windows based on an expected location of the previously accessed base station, and wherein the predetermined time is determined according to the time to search over the plurality of search windows.

26. A wireless communication system, including a wireless communication device, comprising:
means for accessing a base station;
means for entering into a low power state after accessing the base station;
means for generating a wake-up signal at a predetermined time prior to a page indicator from the previously accessed base station;
means for searching for the previously accessed base station within at least one of a plurality of search windows in response to the wake-up signal;
means for demodulating the page indicator when the previously accessed base station is located within one of the plurality of search windows; and
means for determining the plurality of search windows based on an expected location of the previously accessed base station, and wherein the predetermined time is determined according to the time to search over the plurality of search windows.

27. Processor readable media operable to perform the following:
accessing a base station;
entering into a low power state after accessing the base station;
generating a wake-up signal at a predetermined time prior to a page indicator from the previously accessed base station;
searching for the previously accessed base station within at least one of a plurality of search windows in response to the wake-up signal;
demodulating the page indicator when the previously accessed base station is located within one of the plurality of search windows; and
determining the plurality of search windows based on an expected location of the previously accessed base station, and wherein the predetermined time is determined according to the time to search over the plurality of search windows.

* * * * *